(No Model.)
J. P. WARREN.
EXTENSIBLE STOVE PIPE JOINT.
No. 428,359. Patented May 20, 1890.
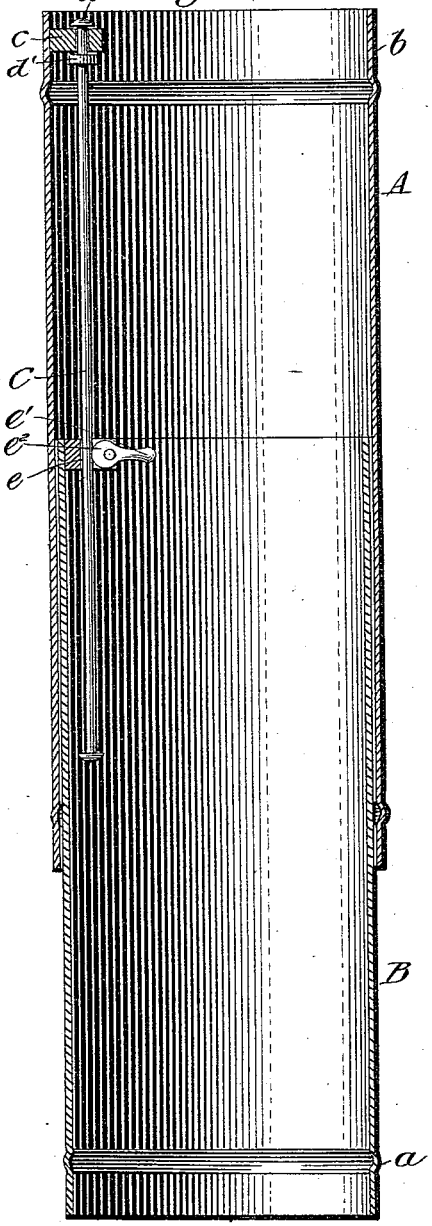
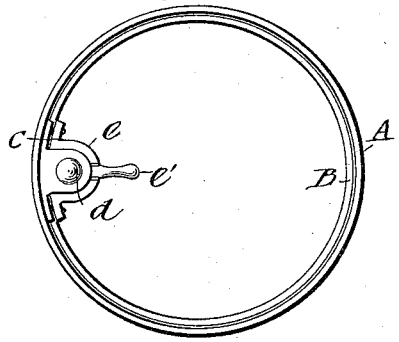
WITNESSES:
INVENTOR:
ATTORNEYS

UNITED STATES PATENT OFFICE.

JAMES P. WARREN, OF CHICAGO, ILLINOIS.

EXTENSIBLE STOVE-PIPE JOINT.

SPECIFICATION forming part of Letters Patent No. 428,359, dated May 20, 1890.

Application filed December 2, 1889. Serial No. 332,277. (No model.)

*To all whom it may concern:*

Be it known that I, JAMES P. WARREN, of Chicago, in the county of Cook and State of Illinois, have invented a new and useful Improvement in Extensible Stove-Pipe Joints, of which the following is a full, clear, and exact description.

The ordinary stove-pipe is made in joints of convenient length. These are slipped together at the ends, being made male and female to effect such a connection, there being beads produced on the pipe-sections near the ends, which prevent these sections from telescoping upon each other.

In the setting up of stoves and the connection of draft-pipe thereto it frequently happens that the regular lengths of pipe-sections will not suit the situation, and in consequence a special joint must be made to afford a correct length of pipe.

The object of my invention is to provide a simple and convenient device whereby a joint of stove-pipe may be quickly and conveniently altered in its length to suit the situation and afford a correct length to the draft-pipe of a stove and avoid the construction of a special joint therefor.

To this end my invention consists in the peculiar construction of parts and their combination, as hereinafter described, and pointed out in the claim.

Reference is to be had to the accompanying drawings, forming a part of this specification, in which similar letters of reference indicate corresponding parts in both figures.

Figure 1 is a longitudinal section of the device on the line 1 1 in Fig. 2. Fig. 2 is an end view of the extensible stove-pipe.

The extensible stove-pipe joint consists, essentially, of two sections A B, which are male and female. These are of about the same length and such relative diameters that the section A will receive the section B and permit it to slide neatly within until a bead $a$ on the male section B is engaged by the adjacent end of the enveloping-section A. The female section A is beaded at each end, in the usual manner, for ornament, and also to limit the insertion of its terminal end $b$ within a mating pipe-joint. (Not shown.)

Upon the inner surface of the section A, near its free end $b$, a small bracket-block $c$ is secured by rivets, said block having a perforation in its body, in which the end of a stay-rod C is inserted. A collar $d$ is formed on the stay-rod C, which has a loose bearing upon the side of the block $c$, and a nut or collar $d'$ is affixed upon the terminal end of the rod, so as to loosely engage the opposite side of the block $c$, thus securing the rod C to the pipe-section A parallel with its interior surface and extended toward the opposite end of said section. The rod C may also be firmly affixed to the block $c$ and made to extend within the pipe-section, as shown.

Upon the inner surface of the section B, near its end which enters the enveloping-section A, a bracket-block $e$ is secured, which is slotted vertically to receive the stay-rod C and allow said rod to slide freely through it. The block $e$ is provided with a cam $e^2$, formed on a short projecting lever $e'$, said cam being pivoted between the jaws produced on the block $e$ by slotting it, as previously mentioned, the face of the cam being adapted to press upon the body of the rod C when said cam is adjusted, as shown in Fig. 2, the loosening of the cam being effected in an obvious manner, whereby the length from end to end of the sliding male and female sections A B may be adjusted to suit the situation it is to occupy in a draft-pipe for a stove.

Having thus described my invention, what I claim as new, and desire to secure by Letters Patent, is—

As a new article of manufacture, a stove-pipe joint comprising two joints of pipe, a longitudinal rod C, secured at one end to the inner side of one joint, and a vertically-slotted bracket $e$ on the inner side of the other section, the said rod passing through the inner end of said slot, and the vertically-swinging cam $e^2$, pivoted in said slot and bearing at its head against the rod to press it against the base of the slot, substantially as set forth.

JAMES P. WARREN.

Witnesses:
HERMAN H. HACKE,
LOUIS HOMAN.